United States Patent
Sugawara et al.

(10) Patent No.: US 9,076,590 B2
(45) Date of Patent: Jul. 7, 2015

(54) ELECTROCONDUCTIVE POLYMER SUSPENSION SOLUTION, ELECTROCONDUCTIVE POLYMER MATERIAL, AND ELECTROLYTIC CAPACITOR AND METHOD FOR PRODUCING THE SAME

(71) Applicant: NEC TOKIN Corporation, Sendai-shi (JP)

(72) Inventors: Yasuhisa Sugawara, Sendai (JP); Tomoki Nobuta, Sendai (JP); Satoshi Suzuki, Sendai (JP); Yasuhiro Tomioka, Sendai (JP); Hiroyuki Demizu, Sendai (JP); Hiroki Satoh, Sendai (JP)

(73) Assignee: NEC Tokin Corporation, Miyagi (JP)

( * ) Notice: Subject to any disclaimer, the term of this patent is extended or adjusted under 35 U.S.C. 154(b) by 197 days.

(21) Appl. No.: 13/774,505

(22) Filed: Feb. 22, 2013

(65) Prior Publication Data
US 2013/0222978 A1 Aug. 29, 2013

(30) Foreign Application Priority Data
Feb. 23, 2012 (JP) ................. 2012-037325

(51) Int. Cl.
*H01G 9/028* (2006.01)
*H01G 9/025* (2006.01)
*C08L 101/12* (2006.01)
*H01G 9/00* (2006.01)
*H01G 11/48* (2013.01)
*H01G 9/15* (2006.01)

(52) U.S. Cl.
CPC ................. *H01G 9/025* (2013.01); *H01G 9/15* (2013.01); *C08L 101/12* (2013.01); *H01G 9/0036* (2013.01); *H01G 11/48* (2013.01); *Y02E 60/13* (2013.01)

(58) Field of Classification Search
USPC ......... 361/516–519, 523, 525, 528–529, 530, 361/509–512
See application file for complete search history.

(56) References Cited

U.S. PATENT DOCUMENTS

| | | | |
|---|---|---|---|
| 6,987,663 B2 | 1/2006 | Merker et al. | |
| 8,388,865 B2 * | 3/2013 | Sugawara et al. ............. | 252/500 |
| 2011/0080691 A1 | 4/2011 | Ning et al. | |

FOREIGN PATENT DOCUMENTS

| | | |
|---|---|---|
| CN | 101110297 A | 1/2008 |
| CN | 101583671 A | 11/2009 |
| JP | 2005-123630 A | 5/2005 |

OTHER PUBLICATIONS

Office Action mailed Dec. 31, 2014 in related Chinese Application No. 201310055439 with English-language translation (14 pgs.).

* cited by examiner

*Primary Examiner* — Nguyen T Ha
(74) *Attorney, Agent, or Firm* — Foley & Lardner LLP

(57) ABSTRACT

The present invention provides an electroconductive polymer suspension solution and an electroconductive polymer material which has a high electroconductivity and in which the time-related deterioration of the electroconductivity is suppressed. Also, the present invention provides an electrolytic capacitor with a low ESR using the electroconductive polymer material as a solid electrolyte and a method for producing the same.

In the present invention, electroconductive polymer particles 1 in the electroconductive polymer material are bonded via organic dispersant 2 and cross-linker 3 to obtain a strong bond between electroconductive polymer particles 1.

15 Claims, 2 Drawing Sheets

ELECTROCONDUCTIVE POLYMER SUSPENSION SOLUTION, ELECTROCONDUCTIVE POLYMER MATERIAL, AND ELECTROLYTIC CAPACITOR AND METHOD FOR PRODUCING THE SAME

This application is based upon and claims the benefit of priority from Japanese patent application No. 2012-37325, filed on Feb. 23, 2012, the disclosure of which is incorporated herein in its entirety by reference.

BACKGROUND OF THE INVENTION

1. Field of the Invention

The present invention relates to an electroconductive polymer suspension solution, an electroconductive polymer material, and an electrolytic capacitor and a method for producing the same.

2. Description of the Related Art

Electroconductive polymer materials are used for electrodes of capacitors, electrodes of dye-sensitization solar cells and the like, electrodes of electroluminescence displays, and the like. Electroconductive polymers obtained by polymerizing pyrrole, thiophene, 3,4-ethylenedioxythiophene, aniline or the like are known as the electroconductive polymer material.

The above-mentioned electroconductive polymer can be obtained by chemical oxidation polymerization method or electropolymerization method. In late years, since an electroconductive polymer material can easily be obtained, for example, as disclosed in JP 2005-123630 A, there is great interest in a method in which an electroconductive polymer material are formed by applying an electroconductive polymer suspension solution on a substrate such as a condenser body of an electrolytic capacitor, and by drying it.

JP 2005-123630 A discloses an electrolytic capacitor in which an electroconductive polymer material is applied to a solid electrolyte and a polymer outer layer. In JP 2005-123630 A, an electroconductive polymer material, which is composed of an electroconductive polymer particle (polythiophene), a polyanion and a binder, is used as a solid electrolyte or a polymer outer layer, to realize a reduction of an ESR (equivalent series resistance) and a leakage current of the electrolytic capacitor.

The electroconductive polymer material disclosed in JP 2005-123630 A is composed ° fan electroconductive polymer particle, a polyanion and a binder, and the composition results in improving adhesiveness with a condenser body and reducing an ESR. However, in the composition of JP 2005-123630 A, since the connection between electroconductive polymer particles is weak, the connection between electroconductive polymer particles is likely to be broken by a time-related deterioration by heat or stress, which results in a problem that the electroconductivity as the electroconductive polymer material is reduced. Therefore, electrolytic capacitors using a conventional electroconductive polymer material in a solid electrolyte have a problem that the ESR is raised by a time-related deterioration.

Thus, in order to solve the above-mentioned problem, the object of the present invention is to provide an electroconductive polymer suspension solution and an electroconductive polymer material which has a high electroconductivity and in which the time-related deterioration of the electroconductivity is suppressed. Also, the object of the present invention is to provide an electrolytic capacitor with a low ESR using the electroconductive polymer material as a solid electrolyte and a method for producing the same.

SUMMARY OF THE INVENTION

According to the present invention, it is possible to provide an electroconductive polymer suspension solution containing an electroconductive polymer, at least one polyanion, at least one organic dispersant, and at least one cross-linker.

Also, in the electroconductive polymer suspension solution of the present invention, it is preferable that the organic dispersant has a branched structure and a structure which has an adsorption group in a main chain to be adsorbed to the electroconductive polymer and which has one or more hydrophilic and/or hydrophobic side chain.

Also, in the electroconductive polymer suspension solution of the present invention, it is preferable that the organic dispersant has a structure which has two or more carboxyl groups.

Also, in the electroconductive polymer suspension solution of the present invention, it is preferable that the cross-linker has a structure which has two or more oxazoline groups.

Also, in the electroconductive polymer suspension solution of the present invention, it is preferable that it contains 10 to 200 parts by weight of the polyanion, 1 to 120 to parts by weight of the organic dispersant and 0.5 to 120 parts by weight of the cross-linker with respect to 100 parts by weight of the electroconductive polymer.

Also, in the electroconductive polymer suspension solution of the present invention, it is preferable that the electroconductive polymer is a polymer which is composed of at least one of pyrrole, thiophene, and derivatives thereof.

Also, in the electroconductive polymer suspension solution of the present invention, it is preferable that it contains a polystyrene sulfonic acid as the polyanion.

Also, according to the present invention, it is possible to provide an electroconductive polymer material obtained by a heat-drying of the above-mentioned electroconductive polymer suspension solution to remove a solvent, wherein electroconductive polymer particles containing the electroconductive polymer and the polyanion are bonded to each other via the organic dispersant and the cross-linker.

Also, according to the present invention, it is possible to provide an electrolytic capacitor having a solid electrolyte layer which contains the above-mentioned electroconductive polymer material.

Also, the electrolytic capacitor of the present invention may have an anode conductor containing a valve metal and a dielectric layer formed on a surface of the anode conductor, wherein the solid electrolyte layer is formed on the dielectric layer.

Also, in the electrolytic capacitor of the present invention, the solid electrolyte layer may have a first electroconductive polymer compound layer formed on the dielectric layer and a second electroconductive polymer compound layer formed on the first electroconductive polymer compound layer.

Also, in the electrolytic capacitor of the present invention, it is preferable that the valve metal is at least one selected from aluminum, tantalum and niobium.

Also, according to the present invention, it is possible to provide a method for producing an electrolytic capacitor including: forming a dielectric layer on a surface of an anode conductor containing a valve metal; and forming a solid electrolyte layer containing an electroconductive polymer material by an application or an impregnation of the above-mentioned electroconductive polymer suspension solution on the dielectric layer and by a heat-drying of the electroconductive polymer suspension solution to remove a solvent.

Also, according to the present invention, it is possible to provide a method for producing an electrolytic capacitor including: forming a dielectric layer on a surface of an anode conductor containing a valve metal; and forming a solid electrolyte layer having a first electroconductive polymer compound layer and a second electroconductive polymer compound layer on the dielectric layer; wherein the first electroconductive polymer compound layer is formed by a chemical oxidative polymerization or an electropolymerization of a monomer providing a first electroconductive polymer compound on the dielectric layer; and wherein the second electroconductive polymer compound layer is formed by an application or an impregnation of the above-mentioned electroconductive polymer suspension solution on the first electroconductive polymer compound layer and by a heat-drying of the electroconductive polymer suspension solution to remove a solvent.

Also, in the method for producing an electrolytic capacitor of the present invention, it is preferable that the first electroconductive polymer compound is at least one selected from pyrrole, thiophene, aniline, and derivatives thereof.

Also, in the method for producing an electrolytic capacitor of the present invention, it is preferable that the valve metal is at least one selected from aluminum, tantalum and niobium.

According to the present invention, it comes to be possible to provide an electroconductive polymer suspension solution and an electroconductive polymer material which has a high electroconductivity and in which the time-related deterioration of the electroconductivity is suppressed. Also, it comes to be possible to provide an electrolytic capacitor with a low ESR using the electroconductive polymer material as a solid electrolyte and a method for producing the same.

DETAILED DESCRIPTION OF THE PREFERRED EMBODIMENTS

As follows, the electroconductive polymer suspension solution and the electroconductive polymer material obtained from the electroconductive polymer suspension solution as well as the electrolytic capacitor using the electroconductive polymer material and the method for producing the same according to the embodiment of the present invention are explained in detail.
<Electroconductive Polymer Suspension Solution and Electroconductive Polymer Material>

The electroconductive polymer suspension solution according to the present embodiment contains an electroconductive polymer, at least one polyanion, at least one organic dispersant, and at least one cross-linker.

In the composition, in the electroconductive polymer suspension solution, an electroconductive polymer particle containing the electroconductive polymer and the polyanion is dispersed well in a solution in a state where it is chemically or physically bonded to the organic dispersant, and the cross-linker is also dissolved alone in the solution.

Figure 1:
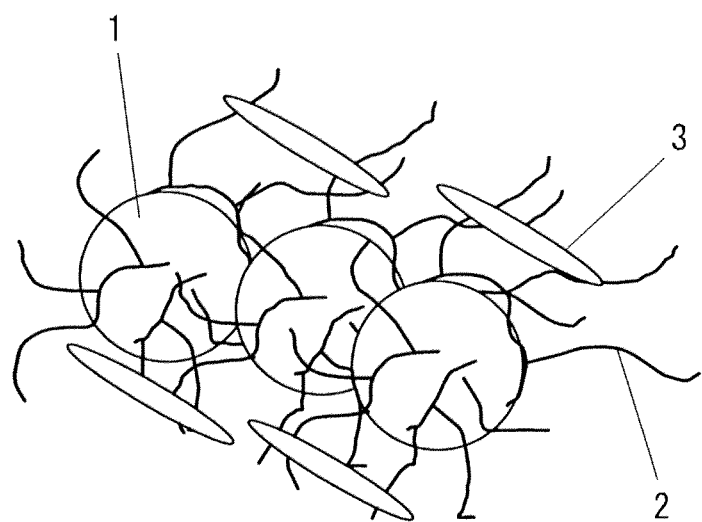
FIG. 1 is a schematic view for explaining a configuration of the electroconductive polymer material of the present invention.

FIG. 1 is a schematic view for explaining a configuration of the electroconductive polymer material of the present invention. The electroconductive polymer material obtained by removing the solvent from the electroconductive polymer suspension solution is cross-linked to the organic dispersant with the cross-linker by the heating at the time of removing the solvent. That is, as shown in FIG. 1. electroconductive polymer particle 1 in the electroconductive polymer material is bonded via organic dispersant 2 and cross-linker 3, and electroconductive polymer particles 1 are strongly bonded each other. Thus, the electroconductive polymer material obtained from the electroconductive polymer suspension solution of the present invention has a high electroconductivity and the time-related deterioration of the electroconductivity can be suppressed.

As the electroconductive polymer contained in the electroconductive polymer suspension solution, a polymer composed of at least one of pyrrole, thiophene and derivatives thereof is preferable. The molecular weight and the property of the electroconductive polymer can be selected depending on the purpose. In the case of the use for electrolytic capacitor, a polymer having a suitable molecular weight and property may be selected. In particular, the electroconductive polymer is preferably a poly(3,4-ethylenedioxythiophene) having a structural unit represented by chemical formula 1 or a derivative thereof. The electroconductive polymer may be a homopolymer or may be a copolymer, and may be one kind or two or more kinds.

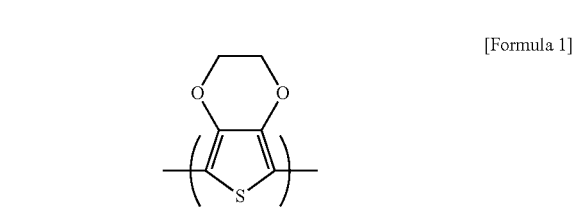

[Formula 1]

The content of the electroconductive polymer in the electroconductive polymer suspension solution is preferably 0.1 to 30 parts by weight with respect to 100 parts by weight of water that is a solvent, and is more preferably 0.5 to 20 parts by weight.

The electroconductive polymer suspension solution of the present embodiment contains a polyanion. Examples of the polyanion include polycarboxylic acids such as polyacrylic acids, polymethacrylic acids and polymaleic acids, polysulfonic acids such as polyvinyl sulfonic acids and polystyrene sulfonic acids, and copolymers having at least one structural unit thereof. Among these, polystyrene sulfonic acids having a structural unit represented by chemical formula 2 are preferable. The polyanion may be one kind or two or more kinds.

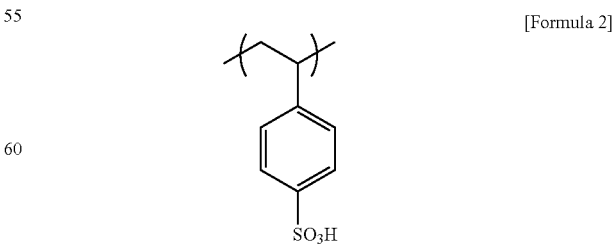

[Formula 2]

The weight average molecular weight of the polyanion is preferably 2000 to 500000, and is more preferably 10000 to 200000.

The electroconductive polymer suspension solution preferably contains an organic dispersant having a branched structure with polyanion. The organic dispersant having a branched structure may be one kind or two or more kinds.

The organic dispersant having a branched structure is preferably an organic dispersant having a structure which contains an adsorption group in a main chain to be adsorbed to the electroconductive polymer and which contains one or more hydrophilic and/or hydrophobic side chain.

Examples of the main chain of the organic dispersant include polyethylenes, polyolefins, polystyrenes, polyesters, polyurethanes, polyamides, polyvinyl acetates and acrylic resins, and copolymers having a structural unit thereof.

Examples of the adsorption group contained in the main chain of the organic dispersant include carboxyl group, sulfo group, phosphoric acid group and amino group. It is particularly preferably a structure which contains two or more carboxyl groups because of a high adsorption performance to an electroconductive polymer.

Examples of the side chain of the organic dispersant include polyethers, polyvinyl alcohols and polyvinylpyrrolidones which are hydrophilic as well as polyethylenes, polyolefins, polystyrenes, polyesters, polyurethanes, polyamides, polyvinyl acetates and acrylic resins which are hydrophobic. The side chain may be one kind, but plural chains are particularly preferably contained because the steric hindrance becomes large and the effect of improving the dispersibility of the particle is increased. The side chain may be one kind or two or more kinds. Both hydrophilic side chain and hydrophobic side chain are particularly preferably contained because the stability of the particle in the electroconductive polymer suspension solution and the strength of the electroconductive polymer material are improved.

As the organic dispersant having a branched structure, a dispersant having a branched structure can be selected from materials having the above-mentioned branched structure which are utilized as a dispersant for a solid particle such as pigment, and can be used. For example, the organic dispersant which is commercially available as "DISPERBYK (registered trademark)-190" used in the Examples described below or the like is preferably used.

The main chain of "DISPERBYK (registered trademark)-190" is an acrylic resin, and the main chain has a carboxyl group as an adsorption group. Also, it is an organic dispersant having a branched structure in which a plurality of side chains of both a polyether that is a hydrophilic group and a polystyrene that is hydrophobic group are contained.

Further, the electroconductive polymer suspension solution of the present embodiment contains a cross-linker. The cross-linker preferably has a structure which contains two or more oxazoline group. For example, the cross-linker which is commercially available as "EPOCROS (registered trademark) WS-700" used in the Examples described below or the like is preferably used. "EPOCROS (registered trademark) WS-700" is a cross-linker having a structure which contains plural oxazoline group in an acrylic chain.

As for the contents of the polyanion, the organic dispersant having a branched structure and the cross-linker in the electroconductive polymer suspension solution, it is preferable that the content of the polyanion is 10 to 200 parts by weight, that the content of the organic dispersant having a branched structure is 1 to 120 parts by weight, and that the content of the cross-linker is 0.5 to 120 parts by weight, with respect to 100 parts by weight of the electroconductive polymer. It is more preferable that the content of the polyanion is 50 to 150 parts by weight and that the content of the organic dispersant having a branched structure is 1 to 50 parts by weight, with respect to 100 parts by weight of the electroconductive polymer.

The electroconductive polymer suspension solution of the present embodiment may contain one or more water-soluble binder. The adhesion to a substrate is improved by adding a water-soluble binder to an electroconductive polymer suspension solution.

Examples of the water-soluble binder include polyvinyl alcohols, polyacrylic acids, polyacrylamides, polyvinylpyrrolidones, polyesters, polyurethanes and polyamides, and copolymers having a structural unit thereof. It can be selected from materials which are utilized as a polymer suspension for coating, and can be used.

Also, the electroconductive polymer suspension solution of the present embodiment may contain erythritol and/or pentaerythritol for the purpose of improving the properties of the electroconductivity, the density and the strength of the electroconductive polymer material.

The electroconductive polymer material according to the present embodiment is obtained by a heat-drying of the above-mentioned electroconductive polymer suspension solution to remove a solvent, wherein electroconductive polymer particles are strongly bonded each other and it has a high electroconductivity. The drying temperature to remove a solvent is not particularly limited as long as it is a temperature which is equal to or higher than the reaction temperature of the organic dispersant and the cross-linker and is equal to or lower than the decomposition temperature of the electroconductive polymer, but it is preferably 100° C. to 300° C. It is more preferably 100° C. to 200° C.

<Method for Producing Electroconductive Polymer Suspension Solution>

The method for producing electroconductive polymer suspension solution according to the present embodiment contains the following steps.

[First Step]

In the present embodiment, a mixture containing an electroconductive polymer is first obtained by a chemical oxidation polymerization of a monomer providing an electroconductive polymer using an oxidant in a solvent containing an organic acid or a salt thereof as a dopant. In the first step, an electroconductive polymer having a high polymerization degree and a high crystallinity can be obtained.

Examples of the dopant include alkyl sulfonic acids, benzenesulfonic acids, naphthalenesulfonic acids, anthraquinone sulfonic acids and camphor sulfonic acids, and derivatives thereof, and irons (III) salts thereof. This sulfonic acid may be a monosulfonic acid, a disulfonic acid, or a trisulfonic acid. Examples of the derivative of the alkyl sulfonic acid include 2-acrylamide-2-methylpropanesulfonic acid. Examples of the derivative of the benzenesulfonic acid include phenolsulfonic acid, styrenesulfonic acid, toluenesulfonic acid and dodecylbenzenesulfonic acid. Examples of the derivative of the naphthalenesulfonic acid include 1-naphthalenesulfonic acid, 2-naphthalenesulfonic acid, 1,3-naphthalenedisulfonic acid, 1,3,6-naphthalenetrisulfonic acid and 6-ethyl-1-naphthalenesulfonic acid. Examples of the derivative of the anthraquinone sulfonic acid include anthraquinone-1-sulfonic acid, anthraquinone-2-sulfonic acid, anthraquinone-2,6-disulfonic acid and 2-methylanthraquinone-6-sulfonic acid. Among these, 1-naphthalenesulfonic acid, 2-naphthalenesulfonic acid, 1,3,6-naphthalenesulfonic acid, anthraquinone disulfonic acid, p-toluenesulfonic acid, camphor sulfonic acid or an iron (III) salt thereof is preferable. Camphor sulfonic acid is further preferable because of the large influence on the high crystallization of the polymer. Camphor sulfonic acid may be an optical active material. The dopant may be one kind or two or more kinds.

The used amount of the dopant is not particularly limited because it can be removed in the second step even if it is excessive, but is preferably 1 to 100 parts by weight with respect to 1 part by weight of the monomer, and is more preferably 1 to 50 parts by weight.

The solvent may be water, an organic solvent or a water-mixed organic solvent. It is preferably selected from solvents which have a good compatibility with the monomer, and is particularly preferably selected from solvents which also have a good compatibility with the dopant and the oxidant. Examples of the organic solvent include alcohol solvents such as methanol, ethanol and propanol, and low polarity solvents such as acetonitrile, acetone and dimethylsulfoxide. The organic solvent may be one kind or two or more kinds. Among these, ethanol or a mixed solvent of ethanol and water is preferable.

As the electroconductive polymer, a polymer composed of at least one of pyrrole, thiophene and derivatives thereof is preferable.

The monomer providing an electroconductive polymer may be selected depending on the intended electroconductive polymer. The monomer may be one kind or two or more kinds.

Polypyrroles and derivatives thereof can be obtained by polymerizing corresponding pyrrole or a derivative of pyrrole. Examples of the derivative of pyrrole include 3-alkylpyrroles such as 3-hexylpyrrole, 3,4-dialkylpyrroles such as 3,4-dihexylpyrrole, 3-alkoxypyrroles such as 3-methoxypyrrole, and 3,4-dialkoxypyrrole such as 3,4-dimethoxypyrrole.

Polythiophenes and derivatives thereof can be obtained by polymerizing corresponding thiophene or a derivative of thiophene. Examples of the derivative of thiophene include 3,4-ethylenedioxythiophene and derivatives thereof, 3-alkylthiophenes such as 3-hexylthiophene, and 3-alkoxythiophenes such as 3-methoxythiophene. Examples of the derivative of 3,4-ethylenedioxythiophene include 3,4-(1-alkyl)ethylenedioxythiophene such as 3,4-(1-hexyl)ethylenedioxythiophene.

Among these, a poly(3,4-ethylenedioxythiophene) represented by chemical formula 3 or a derivative thereof is preferable.

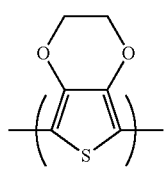

[Formula 3]

The concentration of the monomer in the solvent is preferably 0.1 to 50 wt %, and is more preferably 0.5 to 30 wt %.

The oxidant is not particularly limited, and iron (III) salts of an inorganic acid such as iron (III) chloride hexahydrate, anhydrous iron (III) chloride, iron (III) nitrate nonahydrate, anhydrous ferric nitrate, iron (III) sulfate n-hydrate (n=3 to 12), ammonium iron (III) sulfate dodecahydrate, iron (III) perchlorate n-hydrate (n=1,6) and iron (III) tetrafluoroborate; copper (II) salts of an inorganic acid such as copper (II) chloride, copper (II) sulfate and copper (II) tetrafluoroborate; nitrosonium tetrafluoroborate; salts of a persulfate such as ammonium persulfate, sodium persulfate and potassium persulfate; salts of a periodate such as potassium periodate; hydrogen peroxide, ozone, potassium hexacyanoferrate (III), tetraammonium cerium (IV) sulfate dihydrate, bromine and iodine; and iron (III) salts of an organic acid such as iron (III) p-toluenesulfonic acid can be used. Among these, an iron (III) salt of an inorganic acid or an organic acid, or a persulfate is preferable, and ammonium persulfate or iron (III) p-toluenesulfonate is more preferable, and iron (III) p-toluenesulfonate is further preferable because it has an additional character as a dopant. The oxidant may be one kind or two or more kinds.

The used amount of the oxidant is not particularly limited because it can be removed in the second step even if it is excessive, but is preferably 0.5 to 100 parts by weight with respect to 1 part by weight of the monomer because a polymer having a high electroconductivity is obtained by a milder reaction under oxygen atmosphere, and is more preferably 1 to 50 parts by weight.

The reaction temperature of the chemical oxidation polymerization is not particularly limited, but is generally around the reflux temperature of the solvent used, is preferably 0 to 100° C., and is more preferably 10 to 50° C. If the reaction speed is not suitable, the electroconductivity may be deteriorated. The reaction time of the chemical oxidation polymerization depends on the kind and the supplied amount of the oxidant, the reaction temperature, the stirring condition and the like, but is approximately 5 to 100 hours.

The first step is preferably carried out in a presence of a material having a surfactant function. As the material having a surfactant function, an anionic surfactant, a cationic surfactant, or an amphoteric surfactant can be used, and dodecylbenzenesulfonic acid or a polyethylene glycol is preferable.

[Second Step]

In the second step, the electroconductive polymer is collected from the mixture obtained by the first step. Specifically, the electroconductive polymer is separated and washed from the reaction liquid containing the electroconductive polymer obtained by a chemical oxidation polymerization to remove the dopant, the unreacted monomer, a residual metal ion and an anion derived from the oxidant. In the second step, sufficient purification processing is possible, and an electroconductive polymer with high purity can be obtained.

Examples of the method for separating the electroconductive polymer from the reaction liquid include filtration method and centrifugal method.

The cleaning solvent used is preferably a solvent in which the electroconductive polymer is not dissolved and the monomer and/or the oxidant can be dissolved. Examples of the washing solvent include water and alcohol solvents such as methanol, ethanol and propanol. The washing solvent may be one kind or two or more kinds. The extent of the washing can be confirmed by pH measurement and colorimetric observation of the washing solvent after the washing.

Further, it is preferable to carry out a hot water washing and/or a heat treatment of the electroconductive polymer because the metal component derived from the oxidant can highly be removed. The temperature of the heat treatment is not particularly limited as long as it is a temperature which is equal to or lower than the decomposition temperature of the electroconductive polymer, but is preferably less than 300° C. Also, it is valid as a method for removing the metal ion and the anion derived from the oxidant to carry out an ion-exchange treatment using an ion exchange resin.

The impurity contained in the electroconductive polymer can be quantitated by ICP emission analysis or ion chromatography.

[Third Step]

In the third step, an oxidant is mixed with the electroconductive polymer collected by the second step in an aqueous solvent containing a polyanion. In the third step, an electroconductive polymer suspension solution, in which the electroconductive polymer is dispersed well, can be obtained by acting the polyanion as an organic dispersant and the oxidant to the electroconductive polymer. The dispersion mechanism is thought to be at least a doping function of the anion derived from the polyanion.

As the polyanion, the above-mentioned polyanion can be used. Among these, a polystyrene sulfonic acid is preferable. The weight average molecular weight of the polyanion is preferably 2000 to 500000 and is more preferably 10000 to 200000.

As the aqueous solvent, water is preferable, but there is no problem even if a water-soluble organic solvent is added. The water-soluble organic solvent is selected from the materials suitable for oxidation reaction to be used, and can be used. Also, in the case where the mixture liquid obtained by the third step is directly used in the fourth step with these requirements, it is preferable to select and use an organic solvent usable as a solvent (solvent body) of the finally-obtained electroconductive polymer suspension solution. Examples of the organic solvent include, for example, alcohol solvents such as methanol, ethanol and propanol, and low polarity solvents such as acetonitrile, acetone and dimethylsulfoxide. The organic solvent may be one kind or two or more kinds.

The reaction temperature in the third step is not particularly limited, but is preferably 0 to 100° C., and is more preferably 10 to 50° C. The reaction time is not particularly limited, but is approximately 5 to 100 hours. Also, after the third step, it is preferable to carry out the above-mentioned ion-exchange treatment.

[Fourth Step]

In the fourth step, an organic dispersant having a branched structure is added and the electroconductive polymer is then crushed. The electroconductive polymer suspension solution having a high dispersibility can be obtained by crushing the electroconductive polymer after adding the organic dispersant having a branched structure. By crushing in the fourth step, at least a part of the electroconductive polymer, i.e. all or a part of the electroconductive polymer, can be crushed to 100 nm or less.

The used amount of the organic dispersant having a branched structure is preferably 1 to 120 parts by weight with respect to 100 parts by weight of the electroconductive polymer obtained by the second step, and is more preferably 1 to 50 parts by weight.

A cross-linker is further mixed with a mixture obtained by the above-mentioned step. The used amount of the cross-linker is preferably 0.5 to 120 parts by weight with respect to 100 parts by weight of the electroconductive polymer obtained by the second step, and is more preferably 1 to 50 parts by weight.

<Electrolytic Capacitor and Method for Producing the Same>

The electrolytic capacitor according to the present embodiment has the above mentioned electroconductive polymer material obtained by the electroconductive polymer suspension solution as a solid electrolyte layer. The solid electrolyte layer is preferably in a solid state. The electrolytic capacitor according to the present embodiment is an electrolytic capacitor with a low ESR because the material by which the solid electrolyte is formed has a high electroconductivity. Further, in the electroconductive polymer material of the present invention, since the electroconductive polymer particle in the electroconductive polymer material is bonded via the organic dispersant and the cross-linker to be connected by a strong bond between the electroconductive polymer particles, the time-related deterioration of the electroconductivity can be suppressed. Since the electrolytic capacitor according to the present embodiment has the above-mentioned electroconductive polymer material as a solid electrolyte layer, there is obtained an effect that the increase of the ESR by a time-related deterioration is suppressed and that the reliability is improved.

Figure 2:
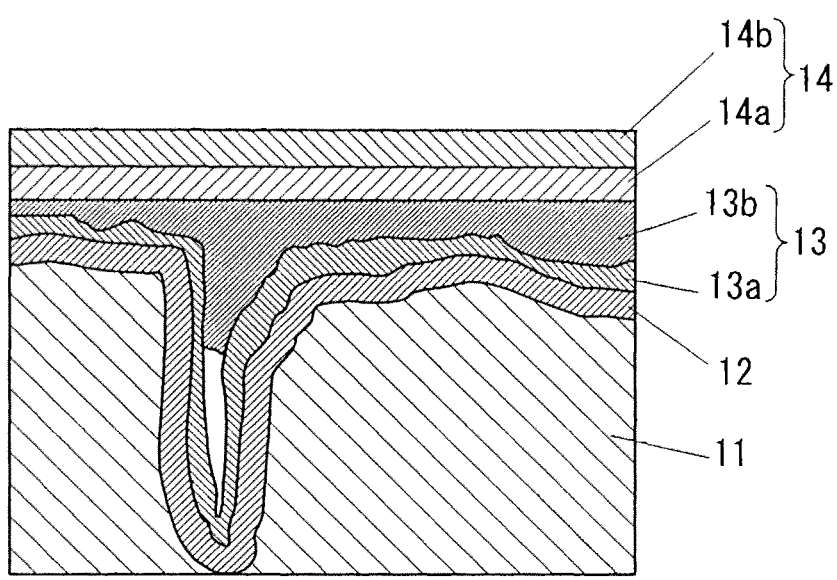
FIG. 2 is a schematic cross-sectional view for explaining a configuration of the electrolytic capacitor according to the present embodiment.

FIG. 2 is a schematic cross-sectional view for explaining a configuration of the electrolytic capacitor according to the present embodiment. This electrolytic capacitor has a configuration in which dielectric layer 12, solid electrolyte layer 13 and cathode conductor 14 are formed in this order on the surface of anode conductor 11.

Anode conductor 11 is formed of: a plate, a foil or a wire of a valve metal; a sintered body containing a fine particle of a valve metal; a porous metal subjected to a surface area enlargement treatment by etching; or the like. Examples of the valve metal include tantalum, aluminum, titanium, niobium, zirconium, and alloys thereof. Among these, at least one valve metal selected from aluminum, tantalum and niobium is preferable.

Dielectric layer 12 is a layer which can be formed by an electrolytic oxidation of the surface of anode conductor 11, and is also formed in the pores of a sintered body or a porous body. The thickness of dielectric layer 12 can be appropriately adjusted by the voltage of the electrolytic oxidation.

Solid electrolyte layer 13 contains the above-mentioned electroconductive polymer material. Solid electrolyte layer 13 may have a mono-layer structure or may have a multi-layer structure. In solid electrolytic capacitor shown in FIG. 2, solid electrolyte layer 13 has a two-layer structure of first electroconductive polymer compound layer 13a and second electroconductive polymer compound layer 13b.

Further, solid electrolyte layer 13 may contain an electroconductive polymer obtained by polymerizing pyrrole, thiophene, aniline or a derivative thereof; an oxide derivative such as manganese dioxide or ruthenium oxide, or an organic semiconductor such as TCNQ (7,7,8,8-tetracyanoquinodimethane complex salt).

Examples of the method for forming solid electrolyte layer 13 include a method by an application or an impregnation of the above-mentioned electroconductive polymer suspension solution on the surface of dielectric layer 12 and by removing the solvent from the electroconductive polymer suspension solution. Also, solid electrolyte layer 13 in the electrolytic capacitor shown in FIG. 1 can be formed by a method in which first electroconductive polymer compound layer 13a is formed on the surface of dielectric layer 12 by a chemical oxidation polymerization or an electropolymerization of a monomer providing a first electroconductive polymer compound and in which second electroconductive polymer compound layer 13b is formed by an application or an impregnation of the above-mentioned electroconductive polymer suspension solution on first electroconductive polymer compound layer 13a.

As a monomer providing the first electroconductive polymer compound, at least one selected from pyrrole, thiophene, aniline and derivatives thereof can be used. As a dopant used for chemical oxidative polymerization or electropolymerization of this monomer to obtain a first electroconductive polymer compound, sulfonic acid compounds such as benzenesulfonic acid, naphthalenesulfonic acid, phenolsulfonic acid, styrenesulfonic acid and the derivatives thereof are preferable. The molecular weight of the dopant can appropriately be selected from low molecular weight compounds and high molecular weight compounds. The solvent may be water only or may also be a mixed solvent of water and a water-soluble organic solvent.

In the case where second electroconductive polymer compound layer 13b is formed, the method for the application or the impregnation of the electroconductive polymer suspension is not particularly limited. In order to sufficiently fill the electroconductive polymer suspension solution into the porous pore inside, it is preferably left for several minutes to several ten minutes after the application or the impregnation. Further, the immersion is preferably repeated, and is preferably carried out under the reduced-pressured environment from atmosphere or the pressurized environment.

The solvent can be removed from the electroconductive polymer suspension solution by heating and drying the electroconductive polymer suspension. The drying temperature is not particularly limited as long as it is a temperature which is equal to or higher than the reaction temperature of the organic dispersant and the cross-linker and is equal to or lower than the decomposition temperature of the electroconductive polymer, but it is preferably 100° C. to 300° C. It is more preferably 100° C. to 200° C. The drying time must appropriately be optimized by the drying temperature, but is not particularly limited as long as the electroconductivity is not deteriorated.

Cathode conductor 14 is not particularly limited as long as it is a conductor. For example, it can be designed to have a two-layer structure having graphite layer 14a such as graphite and silver electroconductive resin 14b.

EXAMPLES

As follows, the present embodiment is more concretely explained based on the Examples, but the present embodiment is not limited to only these Examples.

Example 1

2 g of 3,4-ethylenedioxythiophene that was a monomer, 2 g of camphor sulfonic acid that was a dopant, and 18 g of iron (III) p-toluenesulfonate that functioned as an oxidant and a dopant were dissolved in 60 ml of ethanol as a solvent. The solution obtained was stirred at room temperature for 24 hours to carry out an oxidation polymerization of the monomer. At this time, the color of the mixture liquid was changed from yellow to dark blue.

The mixture liquid obtained by the above-mentioned step was filtered using a pressure reduction filtration equipment to collect an electroconductive polymer powder. The powder obtained was washed with pure water to remove the excessive oxidant and the excessive dopant. The washing with pure water was repeated until the pH of the filtrate came to be 6 to 7. After the pH came to be 6 to 7, it was further washed with ethanol to remove the monomer, the oxidant and the reacted oxidant (iron (II) p-toluenesulfonate). The washing with ethanol was carried out until the filtrate came to be colorless and transparent.

1 g of the electroconductive polymer powder washed by the above-mentioned step was dispersed in 200 ml of water, and 0.5 g of 20 wt % aqueous solution of a polystyrene sulfonic acid (weight average molecular weight: 50000) as a polyacid (polyanion) was then added. 1.5 g of ammonium persulfate as an oxidant was further added to this mixture liquid, and it was stirred at room temperature for 24 hours. The polythiophene suspension solution obtained was dark navy blue.

3 g of an organic dispersant having a branched structure (DISPERBYK (registered trademark)-190, 40 wt % aqueous solution, BYK-Chemie GmbH) was added to the mixture liquid obtained by the above-mentioned step, and it was stirred at room temperature for 1 hour to completely dissolve the dispersant. DISPERBYK (registered trademark)-190 has plural carboxyl groups in the molecule. After that, the particle in the mixture liquid was crushed using a beads mil to make the average particle diameter be 50 nm. The electroconductive polymer suspension solution (polythiophene suspension solution) obtained maintained dark navy blue. For the measurement of the average particle diameter, dynamic light scattering method (measuring apparatus: Zeta-potential & Particle-size Analyzer ELSZ-2 (Otsuka electronics Co., Ltd.)) was used.

4.8 g of a cross-linker (EPOCROS (registered trademark) WS-700, 25 wt % aqueous solution, NIPPON SHOKUBAI CO., LTD.) was further added to the mixture liquid obtained by the above-mentioned step, and it was stirred at room temperature for 1 hour to completely dissolve the cross-linker. The polythiophene suspension solution obtained maintained dark navy blue.

0.1 ml of the electroconductive polymer suspension solution (polythiophene suspension solution) obtained was dropped on a glass substrate, and it was dried by completely volatilizing the solvent in a thermostatic oven at 125° C. to form an electroconductive polymer film that was electroconductive polymer material.

Example 2

An electroconductive polymer suspension solution (polythiophene suspension solution) was produced in the same manner as in Example 1 except that the added amount of 20 wt % aqueous solution of the polystyrene sulfonic acid (weight average molecular weight: 50000) was set to be 5 g, that the added amount of the organic dispersant having a branched structure (DISPERBYK (registered trademark)-190, 40 wt % aqueous solution, BYK-Chemie GmbH) was set to be 0.2 g, and that 0.32 g of the cross-linker (EPOCROS (registered trademark) WS-700, 25 wt % aqueous solution, NIPPON SHOKUBAI CO., LTD.) was added. In addition, an electroconductive polymer film was formed in the same manner as in Example 1 except that the polythiophene suspension solution obtained was used.

Example 3

An electroconductive polymer suspension solution (polythiophene suspension solution) was produced in the same manner as in Example 1 except that the added amount of 20 wt % aqueous solution of the polystyrene sulfonic acid (weight average molecular weight: 50000) was set to be 10 g, that the added amount of the organic dispersant having a branched structure (DISPERBYK (registered trademark)-190, 40 wt % aqueous solution, BYK-Chemie GmbH) was set to be 0.04 g, and that 0.032 g of the cross-linker (EPOCROS (registered trademark) WS-700, 25 wt % aqueous solution, NIPPON SHOKUBAI CO., LTD.) was added. In addition, an electroconductive polymer film was formed in the same manner as in Example 1 except that the polythiophene suspension solution obtained was used.

Comparative Example 1

In Comparative Example 1, an electroconductive polymer suspension solution (polythiophene suspension solution) was produced by a conventional method. Specifically, 2 g of a polystyrene sulfonic acid with a weight average molecular weight of 4000, 0.5 g of 3,4-ethylenedioxythiophene and 0.05 g of iron (III) sulfate were dissolved in 20 ml of water, and air was introduced for 24 hours to produce a polythiophene suspension solution. 0.5 g of a polyvinyl alcohol that was a bonding agent was added to this polythiophene suspension solution to complete a polythiophene suspension solution. In addition, an electroconductive polymer film was formed in the same manner as in Example 1 except that the polythiophene suspension solution obtained was used.

The surface resistances ($\Omega/\square$) and the film thicknesses of the electroconductive polymer films obtained by Examples 1 to 3 and Comparative Example 1 were measured by a four-terminal method to calculate the electroconductivity (S/cm) for evaluating the electroconductivity. Also, the electroconductive polymer films obtained were left at 125° C. for 500 hours, and the electroconductivities were compared to those before the leaving operation for evaluating the time-related deterioration of the electroconductivity. The results are shown in TABLE 1. Note that, the electroconductivity ratio described in TABLE 1 is a comparison value of the electroconductivity left at 125° C. for 500 hours when the electroconductivity (initial) is set to be 1. When the value of the electroconductivity ratio is small, the deterioration of the electroconductivity is large.

TABLE 1

| | Ratio (parts by weight) with respect to 100 parts by weight of electroconductive polymer | | | | Electro-conductivity (initial) (S/cm) | Electro-conductivity ratio (left at 125° C. for 500 hrs)/ (initial) |
|---|---|---|---|---|---|---|
| | Polyanion | Organic dispersant | Cross-linker | Bonding agent | | |
| Example 1 | 10 | 120 | 120.0 | — | 230 | 0.8 |
| Example 2 | 100 | 8 | 8.0 | — | 330 | 0.8 |
| Example 3 | 200 | 1 | 0.5 | — | 280 | 0.4 |
| Comparative Example 1 | 400 | — | — | 100 | 45 | 0.2 |

As shown in TABLE 1, the electroconductive polymer films obtained in Examples 1 to 3 had a higher electroconductivity and a smaller deterioration of the electroconductivity than those of the electroconductive polymer film obtained in Comparative Example 1. That is, it has become possible that the electroconductive polymer material of the present embodiment comes to have a high electroconductivity and that the time-related deterioration of the electroconductivity is suppressed, by the reason that the electroconductive polymer materials are bonded via the organic dispersant and the cross-linker to obtain a strong bond between the electroconductive polymer particles.

Example 4

Porous aluminum was used as an anode conductor including a valve metal, and an oxide coating film that was a dielectric layer was formed on the surface of the aluminum by anodic oxidation. It was divided into the anode part and the cathode part by an insulation resin. Then, the cathode part of the anode conductor on which the dielectric layer was formed was immersed in and taken out from the polythiophene suspension solution manufactured in Example 2, and it was then dried and solidified in a thermostatic oven at 125° C. to form a solid electrolyte layer. In addition, on the solid electrolyte layer, a graphite layer and a silver electroconductive resin were formed in this order to obtain an electrolytic capacitor.

Example 5

Porous aluminum was used as an anode conductor including a valve metal, and an oxide coating film that was a dielectric layer was formed on the surface of the aluminum by anodic oxidation. It was divided into the anode part and the cathode part by an insulation resin. Then, the cathode part of the anode conductor having the dielectric layer formed was immersed in and taken out from a monomer liquid, in which 10 g of pyrrole was dissolved in 200 ml of pure water, and was immersed in and taken out from an oxidant liquid, in which 20 g of p-toluenesulfonic acid as a dopant and 10 g of ammonium persulfate as an oxidant was dissolved in 200 ml of pure water, in this order. These operations were repeated 10 times and chemical oxidative polymerization was carried out to form a first electroconductive polymer compound layer.

The polythiophene suspension solution produced in Example 2 was dropped onto the first electroconductive polymer compound layer, and it was dried and solidified in a thermostatic oven at 125° C. to form a second electroconductive polymer compound layer. In addition, on the solid electrolyte layer including the first electroconductive polymer compound layer and the second electroconductive polymer compound layer, a graphite layer and a silver electroconductive resin were formed in this order to obtain an electrolytic capacitor.

Comparative Example 2

An electrolytic capacitor was produced in the same manner as in Example 4 except that the polythiophene suspension solution produced in Comparative Example 1 was used instead of the polythiophene suspension solution produced in Example 2.

The ESRs of the solid electrolytic capacitors obtained in Example 4, Example 5 and Comparative Example 2 were each measured using an LCR meter at a frequency of 100 kHz. The ESR values were normalized from the value of the total cathode area to the value of the unit area (1 cm$^2$). The solid electrolytic capacitors obtained were left at 125° C. for 500 hours, and the ESRs were compared to those before the leaving operation. The results are shown in TABLE 2.

TABLE 2

|  | ESR (initial) (mΩ · cm$^2$) | ESR (left at 125° C. for 500 hrs)/(initial) |
|---|---|---|
| Example 4 | 1.5 | 1.8 |
| Example 5 | 1.4 | 1.7 |
| Comparative Example 2 | 3.7 | 4.9 |

As shown in TABLE 2, the electrolytic capacitors obtained in Examples 4 and 5 had a lower ESR and a smaller ESR increase by the leaving operation it at 125° C. for 500 hour than those of the electrolytic capacitor obtained in Comparative Example 2. Thus, by using the electroconductive polymer material of the present invention for the solid electrolyte layer, it has become possible to obtain an electrolytic capacitor with a low ESR. Further, there has been obtained an effect that the electrolytic capacitor of the present invention has a small ESR increase and an excellent reliability.

What is claimed is:

1. An electroconductive polymer suspension solution, comprising:
    an electroconductive polymer,
    at least one polyanion,
    at least one organic dispersant,
    and at least one cross-linker,
    wherein the electroconductive polymer suspension comprises 10 to 200 parts by weight of the polyanion, 1 to 120 to parts by weight of the organic dispersant and 0.5 to 120 parts by weight of the cross-linker with respect to 100 parts by weight of the electroconductive polymer.

2. The electroconductive polymer suspension solution according to claim 1, wherein the organic dispersant has a branched structure and a structure which comprises an adsorption group in a main chain to be adsorbed to the electroconductive polymer and which comprises one or more hydrophilic and/or hydrophobic side chain.

3. The electroconductive polymer suspension solution according to claim 1, wherein the organic dispersant has a structure which comprises two or more carboxyl groups.

4. The electroconductive polymer suspension solution according to claim 1, wherein the cross-linker has a structure which comprises two or more oxazoline groups.

5. The electroconductive polymer suspension solution according to claim 1, wherein the electroconductive polymer is a polymer which is composed of at least one of pyrrole, thiophene, and derivatives thereof.

6. The electroconductive polymer suspension solution according to claim 1, comprising a polystyrene sulfonic acid as the polyanion.

7. An electroconductive polymer material, obtained by a heat-drying of the electroconductive polymer suspension solution according to claim 1 to remove a solvent, wherein electroconductive polymer particles comprising the electroconductive polymer and the polyanion are bonded to each other via the organic dispersant and the cross-linker.

8. An electrolytic capacitor, having a solid electrolyte layer which comprises the electroconductive polymer material according to claim 7.

9. The electrolytic capacitor according to claim 8, comprising an anode conductor comprising a valve metal, and a dielectric layer formed on a surface of the anode conductor, wherein the solid electrolyte layer is formed on the dielectric layer.

10. The electrolytic capacitor according to claim 9, wherein the valve metal is at least one selected from aluminum, tantalum and niobium.

11. The electrolytic capacitor according to claim 8, wherein the solid electrolyte layer comprises a first electroconductive polymer compound layer formed on the dielectric layer and a second electroconductive polymer compound layer formed on the first electroconductive polymer compound layer.

12. A method for producing an electrolytic capacitor, comprising:
    forming a dielectric layer on a surface of an anode conductor comprising a valve metal; and
    forming a solid electrolyte layer comprising an electroconductive polymer material by an application or an impregnation of the electroconductive polymer suspension solution according to claim 1 on the dielectric layer and by a heat-drying of the electroconductive polymer suspension solution to remove a solvent.

13. A method for producing an electrolytic capacitor, comprising:
    forming a dielectric layer on a surface of an anode conductor comprising a valve metal; and
    forming a solid electrolyte layer comprising a first electroconductive polymer compound layer and a second electroconductive polymer compound layer on the dielectric layer;
    wherein the first electroconductive polymer compound layer is formed by a chemical oxidative polymerization or an electropolymerisation of a monomer providing a first electroconductive polymer compound on the dielectric layer; and
    wherein the second electroconductive polymer compound layer is formed by an application or an impregnation of an electroconductive polymer suspension solution on the first electroconductive polymer compound layer and by a heat-drying of the electroconductive polymer suspension solution to remove a solvent,
    wherein the electroconductive polymer suspension solution comprises:
      an electroconductive polymer,
      at least one polyanion,
      at least one organic dispersant, and
      at least one cross-linker.

14. The method for producing an electrolytic capacitor according to claim 13, wherein the first electroconductive polymer compound is at least one selected from pyrrole, thiophene, aniline, and derivatives thereof.

15. A method for producing an electrolytic capacitor, comprising:
    forming a dielectric layer on a surface of an anode conductor comprising a valve metal; and
    forming a solid electrolyte layer comprising an electroconductive polymer material by an application or an impregnation of an electroconductive polymer suspension solution on the dielectric layer and by a heat-drying of the electroconductive polymer suspension solution to remove a solvent, wherein the valve metal is at least one selected from aluminum, tantalum and niobium, and
wherein the electroconductive polymer suspension solution comprises:
  an electroconductive polymer,
  at least one polyanion,
  at least one organic dispersant, and
  at least one cross-linker.

* * * * *